US012737459B2

(12) United States Patent
Ghosemajumder et al.

(10) Patent No.: US 12,737,459 B2
(45) **Date of Patent: *Sep. 15, 2026**

(54) DETECTING FRAUDULENT ELECTRONIC COMMUNICATIONS

(71) Applicant: Reken Corporation, San Francisco, CA (US)

(72) Inventors: Shuman Ghosemajumder, Mountain View, CA (US); Richard Griffiths, San Jose, CA (US); Sebastien Soudan, San Jose, CA (US); Suraj Venkata Raman, Alamo, CA (US); Christian Glauch, Oceanside, CA (US)

(73) Assignee: Reken Corporation, San Francisco, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/900,424

(22) Filed: Sep. 27, 2024

(65) Prior Publication Data

US 2025/0342245 A1 Nov. 6, 2025

Related U.S. Application Data

(60) Provisional application No. 63/643,402, filed on May 6, 2024.

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

| | | | | |
|---|---|---|---|---|
| 12,542,808 B2 * | 2/2026 | Edwards | ............. | G06F 16/9566 |
| 2018/0152471 A1 | 5/2018 | Jakobsson | | |

(Continued)

FOREIGN PATENT DOCUMENTS

| | | |
|---|---|---|
| GB | 2581188 A | 8/2020 |
| WO | PCTUS2527895 | 5/2025 |

OTHER PUBLICATIONS

Unsupervised Pre-training vs. Supervised Fine-tuning for LLMs. May 3, 2024. https://llmmodels.org/blog/unsupervised-pre-training-vs-supervised-fine-tuning-for-llms/ (Year: 2024).*

(Continued)

*Primary Examiner* — Kendall Dolly
(74) *Attorney, Agent, or Firm* — Wei IP Law, PC

(57) ABSTRACT

Techniques are provided for detecting fraudulent electronic communications. Electronic communication content corresponding to an electronic communication is obtained. A risk level of the electronic communication is determined based on the electronic communication content, the risk level corresponding to a likelihood that the electronic communication includes content produced using generative artificial intelligence (AI). Selection of the electronic communication is detected, where the electronic communication is at least partially displayed on a display of a user computing device. In response to detecting selection of the electronic communication, when the risk level of the electronic communication exceeds a fraudulence threshold, a notification is presented, the notification comprising one or more elements indicating that the risk level of the electronic communication is high.

20 Claims, 9 Drawing Sheets

(56) References Cited

U.S. PATENT DOCUMENTS

| | | | |
|---|---|---|---|
| 2019/0222606 | A1 | 7/2019 | Schweighauser et al. |
| 2020/0053111 | A1* | 2/2020 | Jakobsson ........... H04L 63/1416 |
| 2020/0067861 | A1* | 2/2020 | Leddy ................. G06F 21/6245 |
| 2025/0342245 | A1 | 11/2025 | Ghosemajumder et al. |

OTHER PUBLICATIONS

Sep. 10, 2025 WIPO Written Opinion PCT/US2025/027895.

* cited by examiner

DETECTING FRAUDULENT ELECTRONIC COMMUNICATIONS

CROSS-REFERENCE TO RELATED APPLICATIONS; BENEFIT CLAIM

This application claims the benefit of Provisional Application Ser. No. 63/643,402, filed May 6, 2024, the entire contents of which are hereby incorporated by reference as if fully set forth herein, under 35 U.S.C. § 119(e).

FIELD OF THE DISCLOSURE

The present disclosure generally relates to electronic communications, and relates more specifically to detecting fraudulent communications, including fraudulent communications produced using generative AI.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely based on their inclusion in this section.

Digital communication fraud, such as phishing attacks, has become a prevalent threat. Phishing involves fraudulent attempts to manipulate individuals into disclosing sensitive information or performing actions such as sending money or revealing login credentials. Traditional phishing techniques often involve deceptive emails or other electronic communications that are crafted to mimic communications from trustworthy senders, thereby exploiting human vulnerabilities to trick recipients into divulging confidential information, executing malicious actions, or otherwise compromising security. The evolution of artificial intelligence (AI) has introduced a new dimension to phishing attacks. AI-generated phishing emails leverage AI technology to mimic human communication patterns, heightening the effectiveness of deception while circumventing conventional detection methods.

The proliferation of AI-driven phishing poses significant challenges to conventional email security protocols. As AI technologies advance, the threat landscape evolves, necessitating innovative approaches to combat fraudulent activities in electronic communication.

SUMMARY

The appended claims may serve as a summary.

Figure 1:
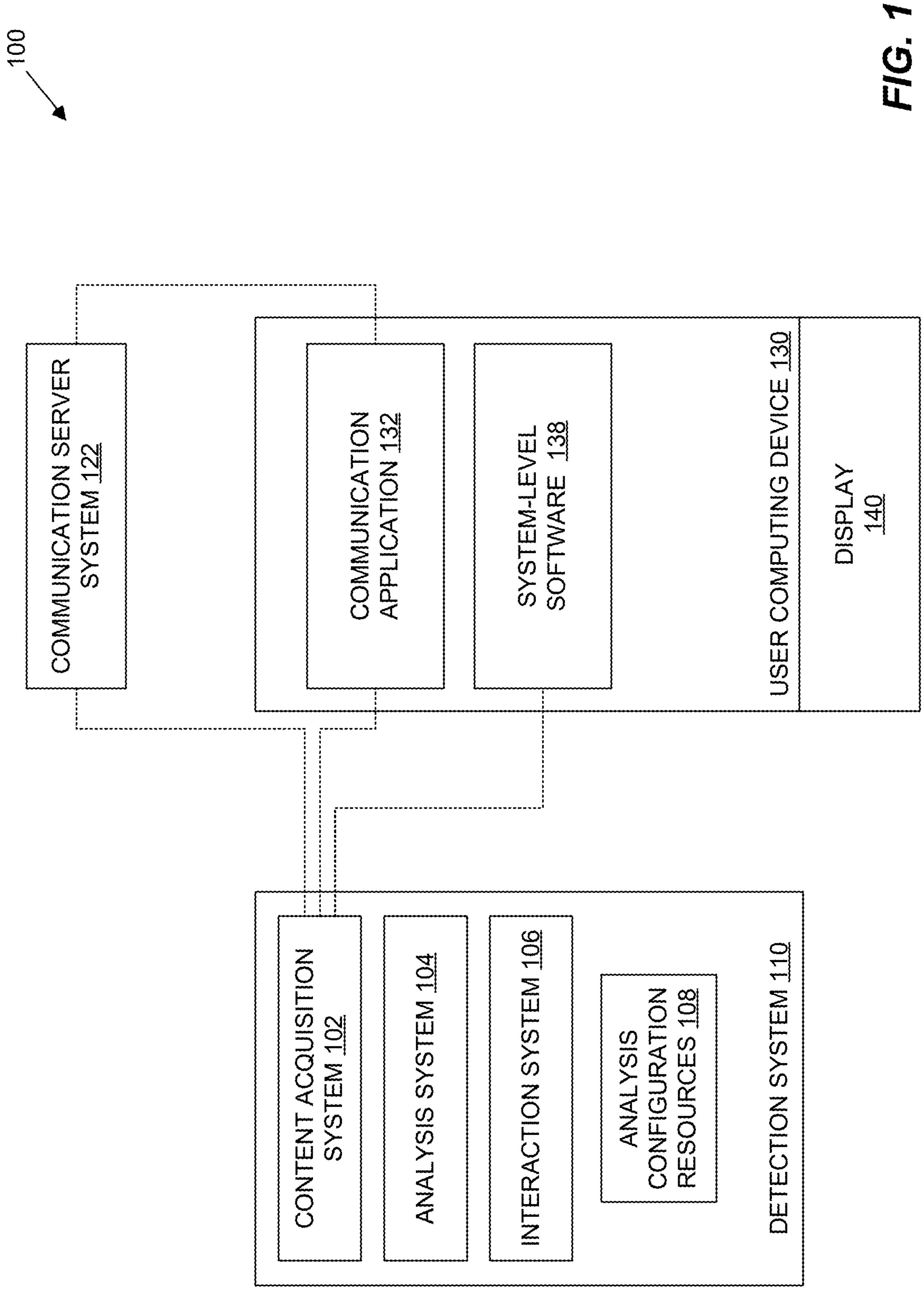
FIG. 1 illustrates a computer system that includes a detection system in an example embodiment.

While each of the drawing figures illustrates a particular embodiment for the purpose of providing a clear example, other embodiments may omit, add to, reorder, or modify any of the elements shown in the drawing figures. Unless otherwise specified, aspects disclosed with respect to an embodiment of an element in a figure may optionally be applied to another embodiment of the element in another figure. For purposes of illustrating clear examples, one or more figures may be described with reference to one or more other figures. However, using the particular arrangement illustrated in such other figure/s is not required in other embodiments.

DETAILED DESCRIPTION

In the following description, numerous specific details are set forth in order to provide a thorough understanding of the subject matter of the present application. It will be apparent, however, to a person of ordinary skill that embodiments may be practiced without incorporating all aspects of the specific details described herein. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features but do not preclude the presence or addition of one or more other features. Unless otherwise specified: "such as" is intended to mean "such as but not limited to"; and examples are intended to be nonlimiting.

A "component" may be hardware and/or software stored in, or coupled to, a memory and/or one or more processors on one or more computers. As an alternative and/or addition, a component may comprise specialized circuitry. A component may be a standalone component, work in conjunction with one or more other components, contain one or more other components, and/or belong to one or more other components.

A "system" may be hardware and/or software stored in, or coupled to, a memory and/or one or more processors on one or more computers. As an alternative and/or addition, a component may comprise specialized circuitry. A system may be a standalone component, work in conjunction with one or more other systems, contain one or more other systems, and/or belong to one or more other systems. A system may be a computer system.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based clusters of computers, virtual machine instances, and/or other computing devices. A computer system may include another computer system, and a computing device may belong to two or more computer systems. Any reference to a "computer system" may mean one or more computers, unless expressly stated otherwise. When a computer system performs an action, the action is performed by one or more computers of the computer system.

A "device" may be a computer system, hardware, and/or software stored in, or coupled to, a memory and/or one or more processors on one or more computers. As an alternative and/or addition, a device may comprise specialized circuitry. For example, a device may be hardwired or persistently programmed to support a set of instructions to perform the functions discussed herein. A device may be a standalone device, work in conjunction with one or more other devices, contain one or more other devices, and/or belong to one or more other devices.

A "client" refers to a combination of integrated software components and an allocation of computational resources, such as memory, a computing device, and/or processes on a computing device for executing the integrated software components. The combination of the software and the computational resources is configured to interact with one or more servers over a network, such as the Internet. A client may refer to either the combination of components on one or more computers, or the one or more computers (also referred to as "client computing devices").

A "server" refers to a combination of integrated software components and an allocation of computational resources, such as memory, a computing device, and/or processes on the computing device for executing the integrated software components. The combination of the software and the computational resources is dedicated to providing a particular type of function on behalf of clients of the server. A server may refer to either the one or more computing devices (also referred to as a "server system") or the combination of components on one or more computing devices. A server system may include multiple servers; that is, a server system may include a first computing device and a second computing device, which may provide the same or different functionality to the same or different set of clients.

General Overview

This document generally describes systems, methods, devices, and other techniques for detecting fraudulent electronic communications.

One aspect of the disclosure is directed to a method comprising: obtaining electronic communication content corresponding to an electronic communication; determining a risk level of the electronic communication based on the electronic communication content, the risk level corresponding to a likelihood that the electronic communication includes content produced using generative artificial intelligence (AI); detecting selection of the electronic communication such that the electronic communication is at least partially displayed on a display of a user computing device; and in response to detecting selection of the electronic communication, when the risk level of the electronic communication exceeds a fraudulence threshold, presenting a notification on the user computing device, the notification comprising one or more elements indicating that the risk level of the electronic communication is high; wherein the method is performed by one or more processors.

In some examples, the method includes: in response to detecting selection of the electronic communication, when the risk level of the electronic communication does not exceed the fraudulence threshold, displaying, on the display of the user computing device, one or more elements indicating that the risk level of the electronic communication is low.

In some examples, the electronic communication is an email.

In some examples, the electronic communication content includes content obtained using an integration framework for an electronic communication client executing on the user computing device.

In some examples, selection of the electronic communication is detected using an integration framework for an electronic communication client executing on the user computing device.

In some examples, the one or more elements are displayed using an integration framework for an electronic communication client executing on the user computing device.

In some examples, the electronic communication content includes content obtained from a communication server configured to handle communications including the electronic communication for a plurality of users including the user.

In some examples, the electronic communication content includes content obtained from system-level software executing on the user computing device.

In some examples, the method further includes: capturing an image rendered on at least a portion of the display of the user computing device; and processing the image to obtain image-derived content; wherein the electronic communication content includes the image-derived content.

In some examples, the method further includes: identifying a flagged portion of the electronic communication content; identifying a display position of the flagged portion on the user computing device; and displaying, by the display position of the flagged portion, a corresponding warning element indicating that the flagged portion is suspect.

In some examples, determining the risk level of the electronic communication is based on a model generated based on supervised learning techniques.

In some examples, determining the risk level of the electronic communication is based on a large language model (LLM).

One aspect of the disclosure is directed to a computer system comprising: one or more hardware processors; and at least one memory storing one or more instructions which, when executed by the one or more hardware processors, cause the one or more hardware processors to perform one or more methods described herein.

One aspect of the disclosure is directed to a non-transitory computer-readable medium storing instructions that, when executed by one or more processors of a computer system, cause the computer system to perform one or more methods described herein.

In some implementations, the various techniques described herein may achieve one or more of the following advantages: individual and/or enterprise customers and their computer systems are protected from phishing attacks, social engineering attacks, and other fraudulent attacks; users are provided interactive guidance regarding potentially fraudulent communications while using electronic communication applications and services; sensitive data and/or systems are protected from breaches and other unauthorized access; monitoring and/or analysis may integrated into user computing devices and/or communication applications to provide ongoing protection during usage; and/or private data may be processed and/or retained locally on a user computing device. Additional features and advantages are apparent from the specification and the drawings.

System Overview

FIG. 1 illustrates a computer system that includes a detection system in an example embodiment. The computer system 100 includes a user computing device 130, a communication server system 122, and a detection system 110. While one communication server system 122, one user computing device 130, and one communication application 132 are shown, the computer system 100 may be adapted to include multiple user computing devices 130, multiple communication applications 132, and/or multiple communication server systems 122 without departing from the spirit or the scope of this disclosure.

The user computing device 130, the communication server system 122, and the detection system 110 may communicate over a network, which may include one or more local area networks (LANs) and/or one or more wide area networks, such as the Internet. As an alternative and/or addition, the detection system 110 and/or components thereof may execute on the user computing device 130, the communication server system 122, and/or other computer systems, and one or more communications may occur over intra-system communication channels. Nonlimiting examples of the detection system 110 deployed over one or more computer systems are described herein.

The user computing device 130 executes system-level software 138, such as an operating system and/or other system-level applications. In some embodiments, the user computing device 130 executes a communication application 132. The communication application 132 may include any application that enables a user to send and/or receive electronic communications. The communication application 132 may communicate with the communication server system 122 to receive one or more electronic communications from the communication server system 122 that are intended for the user to view, including content addressed to the user and/or published content that is accessible to the user. For example, one or more electronic communication/s may be addressed to an email address, phone number, account, handle, or other contact identifier of the user. As an alternative and/or addition, one or more electronic communications may be accessible to the public and/or an account of the user.

As used herein, the term "electronic communication" refers to any digital message comprising digital content intended for a user to view or otherwise consume, such as emails, events, notifications, invitations, social media messages and/or posts, other social media content, message board posts and/or content, direct messages, Short Message Service (SMS) communications, Multimedia Messaging Service (MMS) communications, Rich Communications Services (RCS) communications, iMessage™ communications, other instant messaging communications, collaboration tool communications, voice messages, video messages, and/or any other electronic communication intended for a user to view. In some embodiments, the electronic communications may include one or more of image content, audio content, video content, streaming content, real-time and/or recorded media content, attached digital content, code content, webpage content, and/or any other form of digital content intended for a user to view.

In some embodiments, the communication application 132 is a native application developed for use on a particular operating system, platform, and/or device, such as Microsoft Outlook® for Desktop (e.g., Windows®, Mac®) and Microsoft Outlook Mobile (e.g., Android®, iOS®). As an alternative, the communication application 132 may be a web application, an extension, a plug-in, a cross-platform application, a hybrid application, and/or any other application that enables the user to send and/or receive electronic communications.

The communication application 132 may display one or more electronic communications on a display 140 of the user computing device 130. The display 140 may be integrated with the user computing device 130 and/or communicatively coupled with the user computing device 130, such as via a wired and/or wireless connection. In some embodiments, the communication application 132 displays an electronic communication in a user interface of the communication application 132. As used herein, an application "displaying" any item, including an electronic communication or a portion thereof, refers to the application causing the item to be displayed on the display 140 of the user computing device 130 by sending one or more instructions to system-level software 138; in response, the system-level software 138 creates and/or processes a visual representation of the item for transmission to the display 140 for visual presentation.

In some embodiments, the electronic communications comprise emails. For example, the communication application 132 may comprise an email client, such as Microsoft Outlook. As an alternative and/or addition, the communication server system 122 may comprise an email server, such as a Microsoft Exchange Server®. For example, the communication application 132 may be configured to send and receive emails for an email address of the user via a Microsoft Exchange Server. One or more embodiments described herein may refer to emails, email clients, and/or email servers, but are not limited thereto. That is, such embodiments may be adapted to any electronic communication, communication application, and/or communication server system without departing from the spirit and or/the scope of this disclosure.

Detection System Overview

The detection system 110 is configured to detect fraudulent electronic communications. The detection system 110 includes a content acquisition system 102, an analysis system 104, and an interaction system 106. The detection system 110 and/or its components (e.g. content acquisition system 102, analysis system 104, interaction system 106 and/or analysis configuration resources 108) are presented herein as individual components for case of explanation; the detection system 110 and/or its components may be implemented as one or more dependent or independent processes and/or programs, and may be implemented on one or multiple computers. For example, a component may be implemented as a distributed system. As an alternative and/or addition, multiple instances of one or more components may be implemented. Any action performed by or to one or more components of the detection system 110 may be considered performed by or to the detection system 110.

The content acquisition system 102 is configured to obtain electronic communication content corresponding to an electronic communication. Electronic communication content may include portions of the electronic communication and/or corresponding metadata, such as text, Hypertext Markup Language (HTML), other markup language, images, audio, video, subject content, body content, timestamp data, sender information, recipient information, routing information, other header information, other metadata, and/or any other portion of the electronic communication and/or corresponding metadata. In some embodiments, the content acquisition system 102 may obtain electronic communication content corresponding to an electronic communication that is external to the electronic communication and/or the transmission thereof. For example, the content acquisition system 102 may obtain electronic communication content from system-level software 138 executing on the user computing device 130. The content acquisition system 102 may preprocess the electronic communication content in preparation for analysis. Embodiments of the content acquisition system 102 are described in greater detail hereinafter.

The analysis system 104 is configured to analyze electronic communication content corresponding to one or more electronic communications. For example, the analysis system 104 may be configured to determine a risk level of an electronic communication based on the electronic communication content. The risk level of an electronic communication may correspond to a likelihood that the electronic communication includes content produced using generative artificial intelligence (AI). As an alternative and/or addition, the risk level of an electronic communication may correspond to a likelihood that the electronic communication is malicious, deceptive, or otherwise fraudulent. For example, the electronic communication may implement a phishing attack intended to deceive the user into revealing sensitive information, such as passwords and/or credit card numbers. The analysis system 104 may differentiate between fraudulent and legitimate usage of generative AI. In some embodiments, the risk level is determined based on multiple parameters that are determined during analysis the electronic communication content. In some embodiments, the analysis system 204 may identify flagged portions of an electronic application and/or classify the flagged portions based on risk type. For example, the flagged portion may be a suspicious portion that increases the risk level of an electronic communication. In some embodiments, the flagged portion is likely created using generative AI. Embodiments of the analysis system 104 are described in greater detail hereinafter.

The analysis system 104 may analyze electronic communication content based on one or more analysis configuration resources 108. The analysis configuration resources 108 may include one or more settings, rules, computer-executable instructions, formulas, parameters, templates, models, or any other configuration information usable by the analysis system 104 to control, modify, and/or otherwise configure the analysis of the electronic communication content. In some embodiments, the analysis configuration resources 108 include one or more models generated based on machine learning techniques. As an alternative and/or addition, the analysis configuration resources 108 may include one or more large language models (LLMs). Embodiments of analysis configuration resources 108 are described in greater detail hereinafter.

The interaction system 106 is configured to notify the user regarding the risk level of electronic communications. For example, the interaction system 106 may notify the user when the risk level exceeds a fraudulence threshold by presenting one or more notifications on the user computing device 130, such as one or more visual notifications, sound notifications, haptic notifications, and/or other notifications. In some embodiments, the interaction system 106 may display one or more notifications on the display 140. The interaction system 106 may be configured to notify the user in a contextually relevant manner. For example, the interaction system 106 may notify the user regarding the risk level of an electronic communication after detecting that the user has selected the electronic communication in the communication application 132. The analysis system 104 may analyze the selected electronic communication in response to the interaction system 106 detecting the selection. As an alternative and/or addition, the analysis system 104 may analyze a plurality of electronic communications that include the selected electronic communication prior to detecting the selection. For example, the analysis system 104 may analyze electronic communications using a background process. Embodiments of the interaction system 106 are described in greater detail hereinafter.

Example Implementation in a Network Environment

Figure 2:
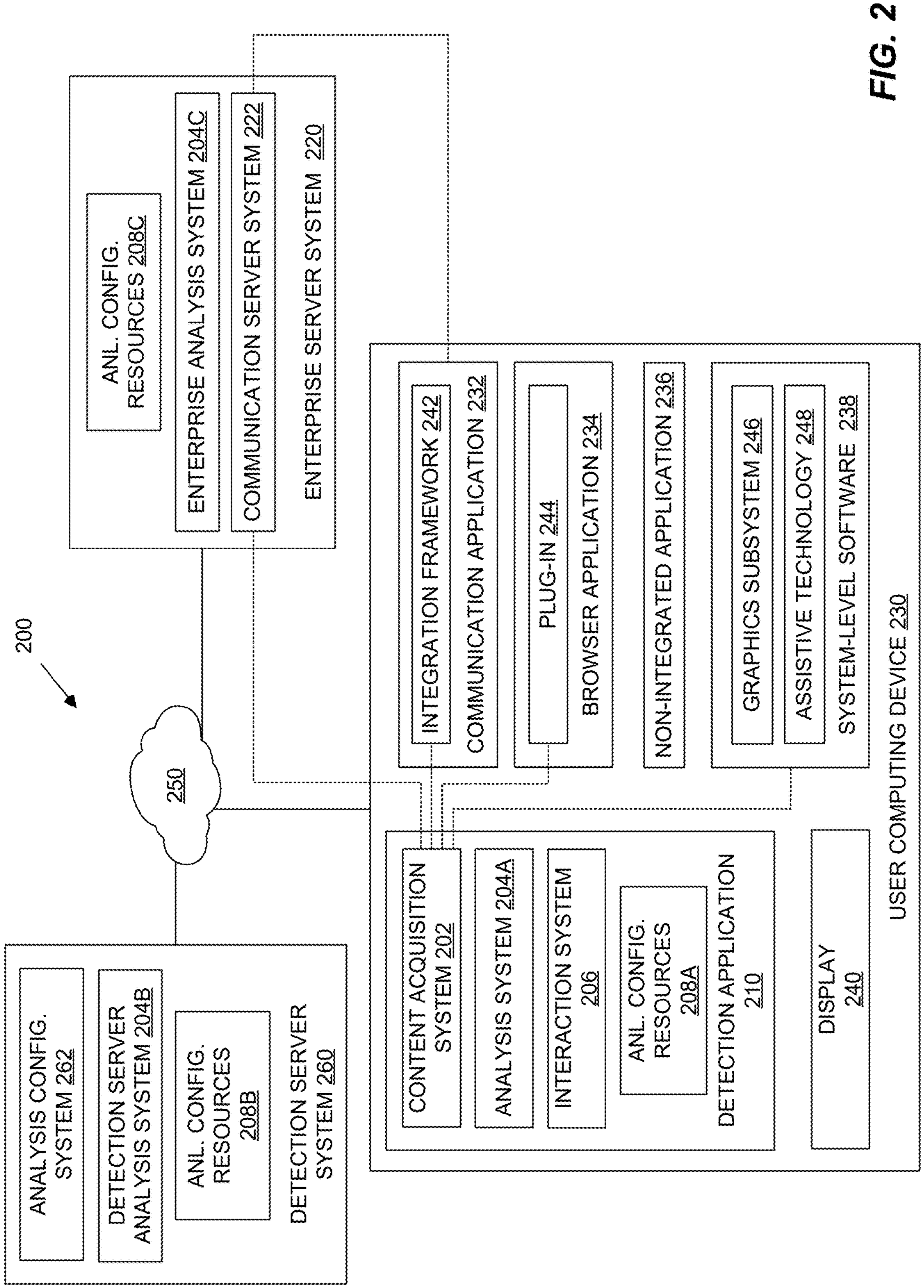
FIG. 2 illustrates a computer system that includes a detection server system, an enterprise server system, and a user computing device executing a detection application in an example embodiment.

FIG. 2 illustrates a computer system 200 that includes a detection server system 260, an enterprise server system 220, and a user computing device 230 executing a detection application 210 in an example embodiment. While one detection server system 260, one enterprise server system 220, and one user computing device 230 are shown, the computer system 200 may be adapted to include multiple detection server systems 260, multiple enterprise server systems 220, and/or multiple user computing devices 230 without departing from the spirit or the scope of this disclosure. The computer system 200 includes a detection system distributed over multiple computer systems; thus, the detection system itself is not labeled. In some embodiments, components of a detection system may be deployed over one computer system or multiple computer systems, such as the user computing device 230, the detection server system 260, and/or the enterprise server system 220; nonlimiting examples are described in greater detail hereinafter.

The detection server system 260, the enterprise server system 220, and the user computing device 230 may communicate over a network 250, which may include one or more local area networks (LANs) and/or one or more wide area networks, such as the Internet. A selection of communication paths is illustrated to facilitate explanation of certain features, but the illustrated communication paths are not intended to include all communication paths between components.

Detection Application

In some embodiments, a detection application 210 executes on the user computing device 230 to detect fraudulent electronic communications for one or more users. The term "user" may apply to an individual who uses the user computing device 230, the detection application 210, the detection system, and/or one or more communication accounts and/or addresses. A user may use other instances of the detection application 210, and/or may use computing devices and/or communication accounts not protected by the detection application 210 or the detection system. In some embodiments, the detection application 210 includes a content acquisition system 202, an analysis system 204A, and an interaction system 206.

The detection application 210 may be implemented as one or more native applications, web applications, extensions, plug-ins, cross-platform applications, hybrid applications, and/or any other application. In some embodiments, the detection application 210 is at least partially implemented using an integration framework 242 of the communication application 232. For example, the detection application 210 may be at least partially implemented as an add-in to Outlook using the Outlook add-in framework, allowing it to extend the functionality of the Outlook communication application 232. As an alternative and/or addition, the detection application 210 may be at least partially implemented as a plug-in 244 of a browser application 234. The browser application 234 may execute one or more communication applications as web application/s executing in an environment of the browser application 234.

Content Acquisition

The content acquisition system 202 is configured to obtain electronic communication content corresponding to one or more electronic communications. For example, the content acquisition system 202 may obtain the electronic communication content by processing electronic communications transmitted to the user computing device 230.

In some embodiments, the detection application 210 obtains electronic communication content in response to one or more events, such as launching a communication application 232, launching the detection application 210, launching another application, viewing an electronic communication, an instruction from a user to acquire content, and/or other events.

As an alternative and/or addition, the detection application 210 may obtain electronic communication content in the background. For example, one or more background processes of the detection application 210 may monitor one or more data sources described herein for electronic communications to process.

The content acquisition system 202 may process the electronic communication content in preparation for analysis, such as by analysis system 204A, analysis system 20B, and/or analysis system 20C. In some embodiments, the content acquisition system 202 may process electronic communication content by preprocessing, filtering, normalizing, classifying, transforming, aggregating, anonymizing, compressing, encrypting, serializing, encoding, validating, and/or otherwise processing the electronic communication content.

Direct Access

In some embodiments, the content acquisition system 202 may have direct access to one or more types of electronic communication content corresponding to one or more electronic communications. Direct access may involve obtaining the electronic communication content from a programmatic entity that is configured to handle the corresponding electronic communications, such as the communication server system 222, a communication application 232, and/or a communication application executing in a browser application 234 environment.

In some embodiments, the content acquisition system 202 directly accesses one or more types of electronic communication content from the communication application 232 when the content acquisition system 202 is at least partially implemented using an integration framework 242 of the communication application 232, such as the Outlook add-in framework.

As an alternative and/or addition, the content acquisition system 202 may directly access one or more types of electronic communication content using an application programming interface (API) exposed by the communication application 232. In some embodiments, when the content acquisition system 202 is at least partially implemented as a plug-in 244 of a browser application 234, the content acquisition system 202 may directly access one or more types of electronic communication content through the browser application 234.

As an alternative and/or addition, the content acquisition system 202 may not have direct access to one or more types of electronic communication components through one or more communication applications. For example, a non-integrated application 236 may not be configured to provide the content acquisition system 202 with any direct access to electronic communication content. Non-integrated applications 236 may include communication applications and/or other applications. The detection application 210 may be configured to indirectly access one or more types of electronic communication content handled by the non-integrated application 236, as described in greater detail hereinafter.

Example Direct Access—Server Systems

In some embodiments, the content acquisition system 202 may directly access one or more types of electronic communication content from a communication server system 222 configured to handle electronic communications. For example, the communication server system 222 may comprise a Microsoft Exchange server, another email server, or another communication server. In some embodiments, the communication server system 222 is deployed in an enterprise server system 220 comprising one or more physical and/or virtual computer systems that are owned by and/or under the control of an enterprise customer. An enterprise customer is an enterprise that uses the detection system. An enterprise customer may allow the content acquisition system 202 to directly access one or more types of electronic communication content via the communication server system 222, such as through an integration framework, an API, and/or other ways.

While the communication server system 222 is illustrated as a component of the enterprise server system 220, the communication server system 222 may be otherwise configured. For example, the communication server system 222 may be deployed in a detection server system 260. The detection server system 260 may be owned by and/or under control of an entity that provides the detection system. In this case, the communication server system 222 may be configured to provide the content acquisition system 202 direct access to one or more types of electronic communication content.

In some embodiments, the communication server system 222 may be owned by and/or under control of a third party. For example, a communication server system 222 may be deployed independently of any detection server system 260 and/or enterprise server system 220. In some embodiments, a third-party communication server system 222 may authorize one or more components of the detection system to have direct access, such as through an API. As an alternative and/or addition, a third-party communication server system 222 may not be configured to provide the content acquisition system 202 with any direct access to any electronic communication content.

Indirect Access

In some embodiments, the content acquisition system 202 indirectly accesses one or more types of electronic communication content corresponding to one or more electronic communications. Indirect access may involve generating the electronic communication content for an electronic communication based on data obtained from a programmatic entity other than the one configured to receive and/or display the electronic communications. For example, the content acquisition system 202 may generate electronic communication content based on data obtained from system-level software

238 executing on the user computing device 230, such as a graphics subsystem 246, assistive technology 248, and/or other system-level software 238. System-level software 238 may include any software that manages and/or controls the hardware and core functionality of a computer system, including the operating system, device drivers, and utility programs. The content acquisition system 202 may utilize one or more APIs to interface with and access the underlying functionality of the system-level software 238.

Example Indirect Access—Image Data

In some embodiments, the content acquisition system 202 generates electronic communication content based on image data. For example, the content acquisition system 202 may obtain and process image data corresponding to at least a portion of an electronic communication. Electronic communication content generated by processing image data is also referred to herein as "image-derived content."

In some embodiments, the image data includes a screenshot comprising at least a portion of the graphical content displayed to a user on a display 240 of the user computing device 230. For example, the content acquisition system 202 may obtain the screenshot from system-level software 238, such as a graphics subsystem 246 of the user computing device 230.

In some embodiments, the image-derived content may comprise text generated using optical character recognition (OCR) techniques. For example, the content acquisition system 202 may use OCR and/or other image processing techniques to generate accurate electronic communication content, such as text, subject content, body content, timestamp data, sender information, recipient information, and/or any other text-based electronic communication content that is displayed.

As an alternative and/or addition, the image-derived content may comprise images contained in the image data. For example, the content acquisition system 202 may identify, in the screenshot or other image data, one or more images that are part of an electronic communication. In some embodiments, when the content acquisition system 202 generates electronic communication content comprising an image associated with the electronic communication, the content acquisition system 202 and/or the analysis system 204A may further analyze the image to determine whether or not the image includes a rendering of text, such as text intended to be deceptive.

Example Indirect Access—Assistive Technology

In some embodiments, the content acquisition system 202 generates electronic communication content based on data obtained from assistive technology 248. The assistive technology 248 may include system-level software 238 executing on the user computing device 230. For example, in the Windows operating system, the content acquisition system 202 may use one or more Windows APIs, (e.g., Microsoft Active Accessibility®, Microsoft UI Automation, Text Services Framework, Microsoft Speech API) to obtain content corresponding to electronic communications received and/or displayed by other applications executing on the user computing device 230, referred to herein as "assistive technology data". For example, one or more APIs corresponding to assistive technology 248 may provide access to content handled by other applications, such as text, images, audio, transcripts, and/or other features. The other applications may include non-integrated applications 236 that are not configured to provide the content acquisition system 202 any direct access to electronic communication content.

The assistive technology data may include content data describing any objects presented for the user to view or otherwise consume, such as text data, voice and/or audio data, image data, caption data, link description data, other alternative representation data, content metadata such as content display position, and/or other data describing content handled by other applications executing on the user computing device 230. The content acquisition system 202 may generate accurate electronic communication content based on the assistive technology data, such as text, subject content, body content, timestamp data, sender information, recipient information, and/or any other electronic communication content that is handled by another application executing on the user computing device 230.

Analysis

The analysis system 204A is configured to analyze electronic communication content corresponding to one or more electronic communications at the user computing device 230. The analysis system 204A may analyze electronic communication content based on one or more analysis configuration resources, such as analysis configuration resources 208A that are stored locally at the user computing device 230. Generally, analysis configuration resource/s 208A-208C may include one or more settings, rules, computer-executable instructions, formulas, parameters, templates, models, and/or any other analysis configuration resource 208A-208C usable by analysis system/s 204A-204C to control, modify, and/or otherwise configure the analysis of the electronic communication content.

In some embodiments, the detection server system 260 includes an analysis configuration system 262. The analysis configuration system 262 generates one or more analysis configuration resources 208A-208C that may be used by one or more analysis systems 204A-204C. For example, the analysis configuration system 262 may create and/or maintain one or more analysis configuration resources 208A-208C, such as rules, settings, computer-executable instructions, formulas, parameters, templates, and/or models. In some embodiments, the analysis configuration system 262 tests one or more analysis configuration resources 208A-208C against one or more test data sets, historical data sets, and/or real-time data sets comprising electronic communication content to determine whether one or more analysis configuration resources 208A-208C should be applied under particular circumstances, for specific computer systems, for specific customers, in specific combinations, and the like. The analysis configuration system 262 may automatically generate one or more analysis configuration resources 208A-208C, automatically modify one or more analysis configuration resources 208A-208C, and/or receive input describing one or more analysis configuration resources 208A-208C and/or modifications thereof.

In some embodiments, the analysis configuration system 262 generates one or more analysis configuration resources 208A-208C comprising a model generated based on supervised learning techniques. For example, the analysis configuration system 262 may obtain labeled data sets for generating a model, such as one or more training datasets, validation datasets, test datasets, and/or other datasets used for training and/or evaluating a model using machine learning techniques. As an alternative and/or addition, the analysis configuration system 262 may generate one or more analysis configuration resources 208A-208C comprising an LLM, such as by fine-tuning an existing LLM with domain-specific data related to legitimate electronic communications and/or fraudulent electronic communications.

In some embodiments, the detection application 210 accesses one or more analysis configuration resources 208A in persistent memory and/or volatile memory at the user computing device 230. In some embodiments, the detection application 210 obtains one or more analysis configuration resources 208A from the detection server system 260. For example, the detection server system 260 and/or the analysis configuration system 262 may maintain analysis configuration resources 208B and provide the analysis configuration resources 208B to one or more user computing devices 230 and/or enterprise server systems 220.

In some embodiments, the detection server system 260 updates the analysis configuration resources 208B and provides one or more updates to one or more user computing devices 230 and/or enterprise server systems 220 to update how the respective analysis system 204A, 204C performs analysis. For example, the updates may include one or more modifications that enhance the operation of analysis systems 204A-204C, such as by improving a false positive and/or false negative detection rate of fraudulent communications, adapting to changes in fraudulent communications and/or generative AI technologies, adding additional detection features, modifying user interaction features, and/or other improvements.

As an alternative and/or addition, the detection server system 260 may provide an update to analysis configuration resources 208A-208C to control, modify, and/or otherwise configure how analysis is performed at one or more user computing devices 230, detection server systems 260, and/or enterprise server systems 220. For example, the detection server system 260 may provide analysis configuration resources 208A to a user computing device 230 to change how analysis is performed at the user computing device 230, such as to increase, reduce, and/or otherwise change the usage of computational resources, types of analysis performed, select specific analysis configuration resources 208A-208C to use, and/or other ways of changing how analysis is performed.

In some embodiments, the detection application 210 analyzes electronic communication content in response to one or more events, such as the launching of an application such as a communication application 232, the opening and/or displaying of an electronic communication, the detection of new electronic communication content (e.g., by content acquisition system 202), receiving instructions from a user to analyze content, and/or other events.

As an alternative and/or addition, the detection application 210 may execute analysis system 204A functionality in the background. For example, the detection application 210 may include one or more background processes configured to analyze electronic communication content, such as by determining a risk level of one or more electronic communications based on electronic communication content.

In some embodiments, the detection system may implement one or more acquisition configuration resources that allow the detection system to control, modify, and/or otherwise configure how content acquisition is performed at one or more user computing devices 230, detection server systems 260, and/or enterprise server systems 220. Techniques described herein with respect to analysis configuration resources may apply to acquisition configuration resources without departing from the spirit or the scope of this disclosure.

Alternative and/or Distributed Analysis System Deployments

FIG. 2 illustrates that a content acquisition system 202, an analysis system 204A, and an interaction system 206 may be deployed on a single computer, such as a user computing device 230. As an alternative and/or addition, one or more components of the detection system may be deployed on multiple computing devices and/or computer systems. For example, the analysis system may be deployed on a user computing device 230, a detection server system 260, an enterprise server system 220 and/or any combination thereof.

In some embodiments, a detection server analysis system 204B is deployed in the detection server system 260. As an alternative and/or addition, an enterprise analysis system 204C may be deployed in the enterprise server system 220. When multiple analysis systems 204A-204C are deployed at multiple computer systems, the analysis of electronic communication content may be distributed across the multiple computer systems.

In some embodiments, when a communication server system 222 executes at the enterprise server system 220, the enterprise analysis system 204C may perform one or more one or more analysis tasks based on information available at the communication server system 222 of the corresponding enterprise. In this case, the enterprise analysis system 204C may perform content acquisition functionality that is specific to acquiring electronic communication content from a communication server system 222 for a plurality of users belonging to the enterprise.

As an alternative and/or addition, when a communication server system 222 is deployed in a detection server system 260 on behalf of a customer, the detection server analysis system 204B may perform one or more one or more analysis tasks based on information available at the communication server system 222 of the corresponding customer. In this case, the detection server analysis system 204B may perform content acquisition functionality that is specific to acquiring electronic communication content from a communication server system 222 for a plurality of users belonging to the customer.

In some embodiments, the distribution of analysis tasks may be dynamically determined based on one or more factors, such as the availability of resources at one or more computer systems, the location the electronic communication content was acquired, privacy considerations, network considerations, and/or other factors. For example, if the user computing device 230 has limited computational power, memory, network bandwidth, and/or other computational resources, at least a portion of the analysis may be offloaded to the detection server system 260.

When an analysis system 204A executes on the user computing device 230 and a detection server analysis system 204B executes on the detection server system 260, the analysis system 204A of the detection application 210 may perform a first set of analysis tasks on the user computing device 230. The detection application 210 may send data corresponding to a second set of analysis tasks to the detection server system 260 for performance by the detection server analysis system 204B.

In some embodiments, the detection application 210 manages the user's sensitive information (e.g., personal data, personal information, personally identifiable information (PII), and/or other sensitive information) without transmitting the sensitive information. For example, the analysis system 204A at the user computing device 230 may process a particular electronic communication by performing a first set of analysis tasks on a first set of electronic communication content that includes sensitive information. In some embodiments, the detection application 210 sends a second set of electronic communication content for analysis by the detection server analysis system 204B. The detection application 210 may anonymize, deidentify, aggregate, tokenize, encrypt, filter, and/or otherwise process the second set of electronic communication content to remove sensitive data before sending.

In some embodiments, removing sensitive data from electronic communication content involves the content acquisition system 202 preprocessing the electronic communication content. As an alternative and/or addition, removing sensitive data from electronic communication content may involve the analysis system 204A performing a preliminary analysis of electronic communication content to generate a result that does not include any sensitive data. As an alternative and/or addition, the analysis system 204A may process an electronic communication content corresponding to a particular electronic communication by sending a non-sensitive portion of the electronic communication content for analysis by the detection server analysis system 204B, receiving a result generated by the detection server analysis system 204B, and associating the result with the electronic communication.

Guiding User Interactions with Electronic Communications

The interaction system 206 is configured to notify the user regarding the risk level of electronic communications. For example, the interaction system 106 may notify the user regarding one or more results of analyzing one or more electronic communications. In some embodiments, the interaction system 106 may notify the user by displaying one or more notifications on the display 240. A notification may include one or more elements for display, such as text, notification boxes, pop-ups, sidebars, tooltips, banners, symbols, flags, icons, interactive controls, and/or any other visual element.

The notifications may indicate that the risk level of the electronic communication is high. As an alternative and/or addition, the interaction system 106 may display a notification to the user indicating that an electronic communication includes content produced using generative artificial intelligence (AI). As an alternative and/or addition, the interaction system 106 may display additional reporting information regarding the analysis of electronic communication content to the user, such as in response to user input.

The interaction system 206 may be configured to display notifications in a contextually relevant manner. For example, the interaction system 206 may monitor the user's interactions with the communication application 232 and/or the user computing device 230 to determine when to report relevant notifications about specific electronic communications. In some embodiments, the interaction system 206 reports relevant notifications when an electronic communication is selected by the user. For example, the interaction system 206 may detect selection of a particular electronic communication by the user such that the electronic communication is at least partially displayed on the display 240. In response to detecting selection of the electronic communication, the interaction system 206 may display and/or otherwise present any relevant notifications to the user (e.g., that the risk level of the electronic communication is high, that the electronic communication includes content produced using generative AI, that the electronic communication is malicious, deceptive, or otherwise fraudulent, and/or any other notification).

Example Features

Nonlimiting examples of interactive and/or displayable features of the interaction system 206 are provided in the context of an email client for email messages. Any combination of these features, variants thereof, and/or similar features may be implemented with any communication application and/or any type of electronic communication without departing from the spirit or the scope of the disclosure. One or more features may be rendered using any technique, such as through an integration framework and/or an API of another application, system-level software 238, and/or other methods.

Figure 3:
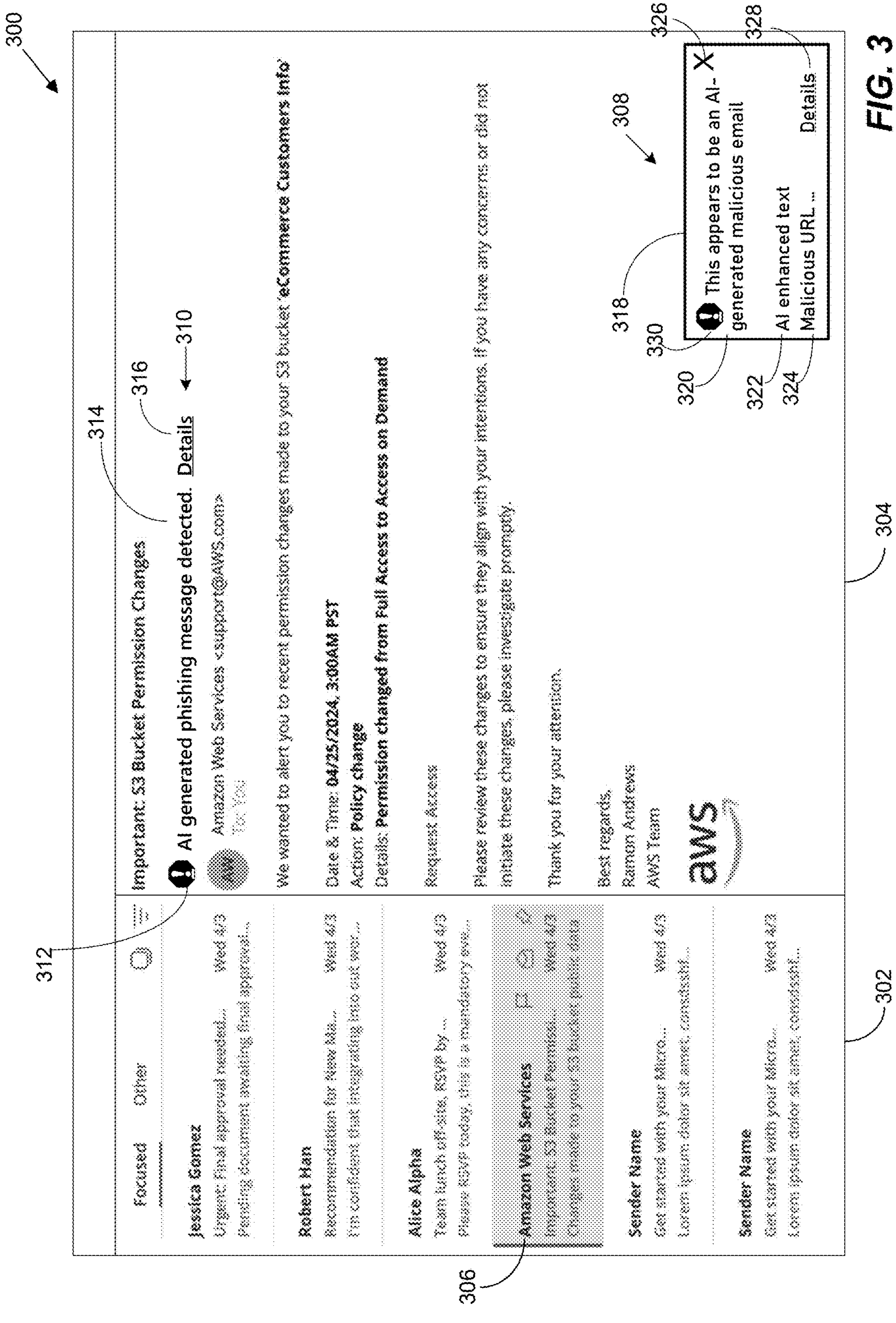
FIG. 3 illustrates a user interface of an email client and notifications comprising elements that indicate a selected email message is fraudulent in an example embodiment.

FIG. 3 illustrates a user interface 300 of a communication application comprising an email client and notifications 308-310 comprising elements 312-330 that indicate a selected email message is fraudulent in an example embodiment. The user interface 300 of the email client includes a message list panel 302 configured to display a list of email messages and a message viewing panel 304 configured to display a selected email message 306. A detection application (e.g., detection application 210) may display one or more notifications 308-310 when the risk level of the selected email message 306 exceeds a fraudulence threshold.

Notification 310 is rendered within the message viewing panel 304. Notification 310 includes a warning icon 312, a warning message 314 (e.g., "AI generated phishing message detected"), and an interactive link 316 to additional information about the notification 310.

Notification 308 is rendered at or near a corner of the user interface 300 of the email client and/or a desktop of the operating system. The notification 308 may be rendered over the user interface 300 of the email client. As an alternative and/or addition, a notification may be rendered at any other location. The notification 308 includes a dialog box 318 that contains a warning icon 330, a warning message 320 ("This appears to be an AI-generated malicious email"), a list of one or more suspicious features 322-324 of the email message 306, a close button 326, and an interactive link 328 to additional information about the notification 308.

Figure 4:
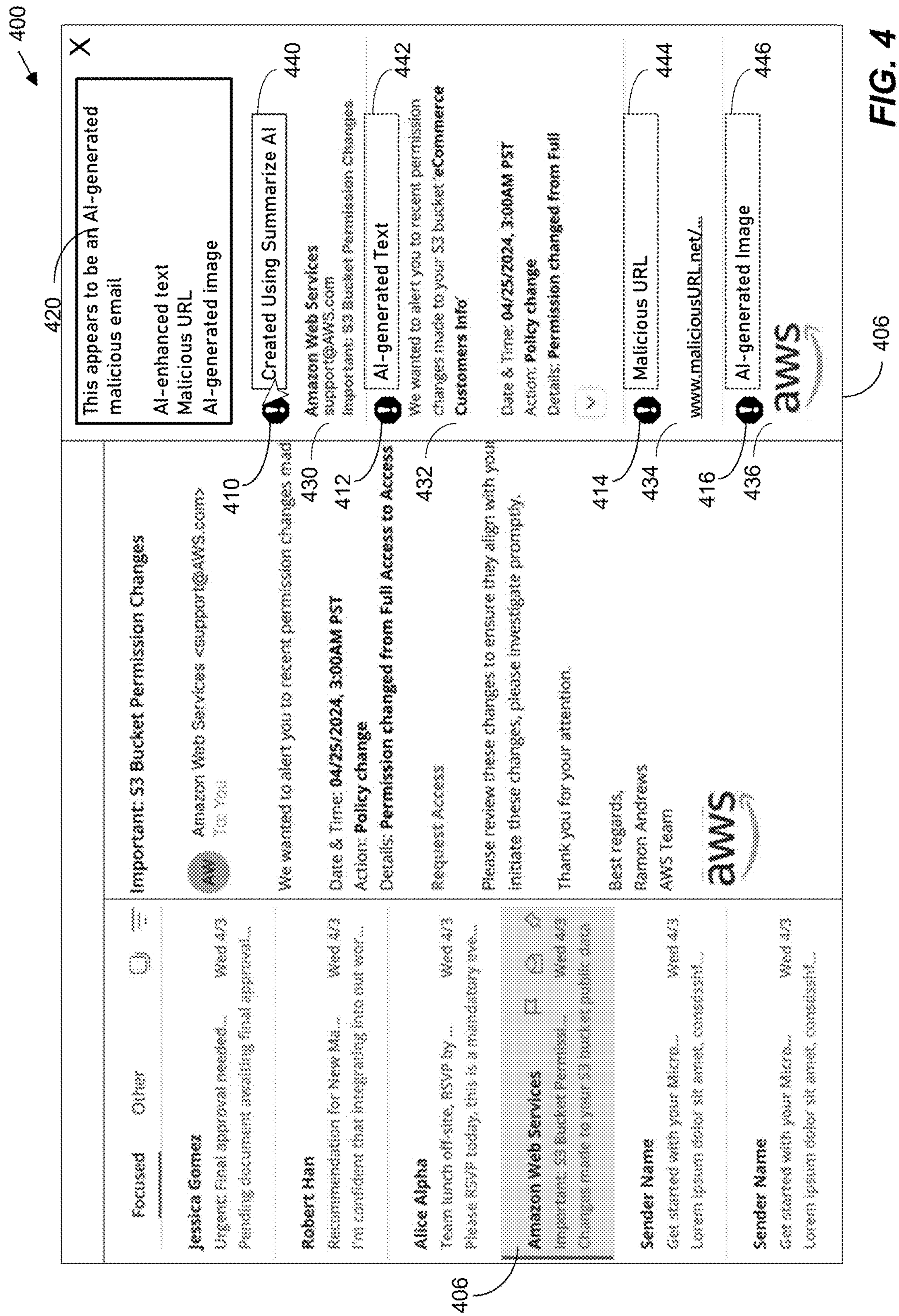
FIG. 4 illustrates a user interface of an email client and an overlay panel comprising a detailed report in an example embodiment.

FIG. 4 illustrates a user interface 400 of an email client and an overlay panel 408 comprising a detailed report in an example embodiment. In some embodiments, the overlay panel 408 comprises additional information about a prior notification (e.g., notification 308) and may be shown in response to a user clicking an interactive link (e.g., interactive link 316) of the prior notification. The elements rendered on the overlay panel 408 include the prior notification 420, a plurality of flagged portions 430-436 of the selected email message 406, and a warning icon 410-416 for each flagged portion 430-436 of the selected email message 406. The warning icons 410-416 may be interactive elements. For example, in response to user interaction such as a mouseover event, a tooltip 440-446 may be displayed comprising additional detail about why the corresponding flagged portion 430-436 is suspicious. A mouse-over event for warning icon 410 is shown, causing tooltip 440 with the text "Created Using Summarize AI" to be displayed. Warning icon 412 includes a tooltip 442 with the text "AI-generated Text" to be displayed. Warning icon 414 includes a tooltip 444 with the text "Malicious URL" to be displayed. Warning icon 416 includes a tooltip 446 with the text "AI-generated Image to be displayed.

Figure 5:
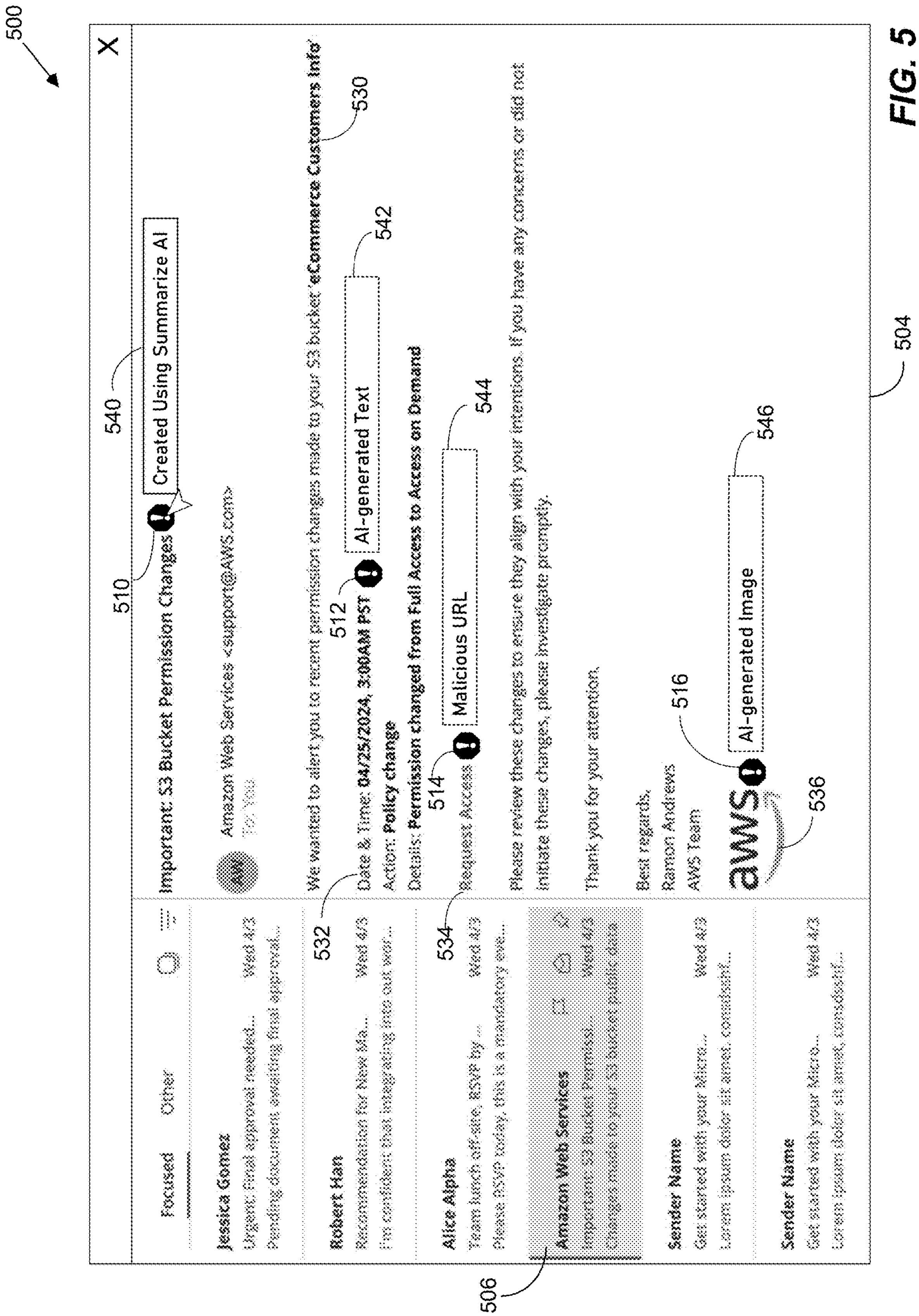
FIG. 5 illustrates a user interface of an email client and notifications comprising elements displayed by flagged portions of a selected email message in an example embodiment.

FIG. 5 illustrates a user interface 500 of an email client and notifications comprising elements 510-516, 540-546 displayed by flagged portions 530-536 of a selected email message 506 in an example embodiment. The warning icons 510-516 are rendered in the context of the message during panel 504 and appear next to the corresponding flagged portions 530-536. In some embodiments, the detection application 110 identifies a display position of the flagged portions 530-536 of the selected email message 506 and displays the corresponding elements 510-516, 540-546 by the corresponding display position.

Figure 6:
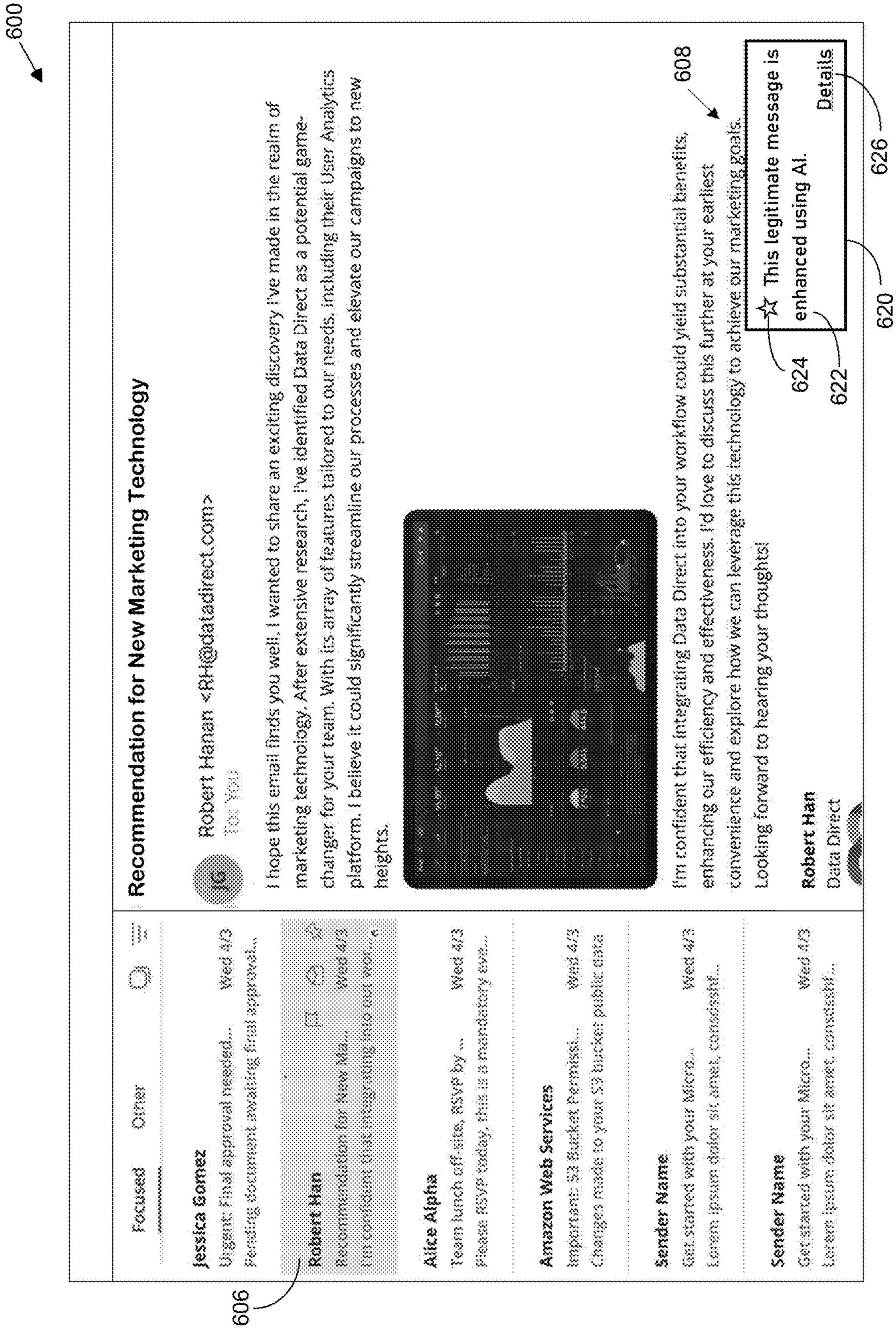
FIG. 6 illustrates a user interface of an email client and a notification comprising elements that indicate a selected email message is legitimate in an example embodiment.

FIG. 6 illustrates a user interface 600 of an email client and a notification 608 comprising elements 620-626 that indicate a selected email message 506 is a legitimate message in an example embodiment. The detection system has identified flagged content in the selected email message 506 that is created using generative AI, even though the risk level of the selected email message 506 was found to be legitimate. For example, the selected email message 506 may have a risk level that does not exceed a fraudulence threshold. Notification 608 includes a dialogue box 620, an approval icon 624, a message 622 (e.g., "This legitimate message is enhanced using AI"), and an interactive link 626 to additional information about the notification 608.

Selection Interface for Screen Capture Analysis

Figure 7:
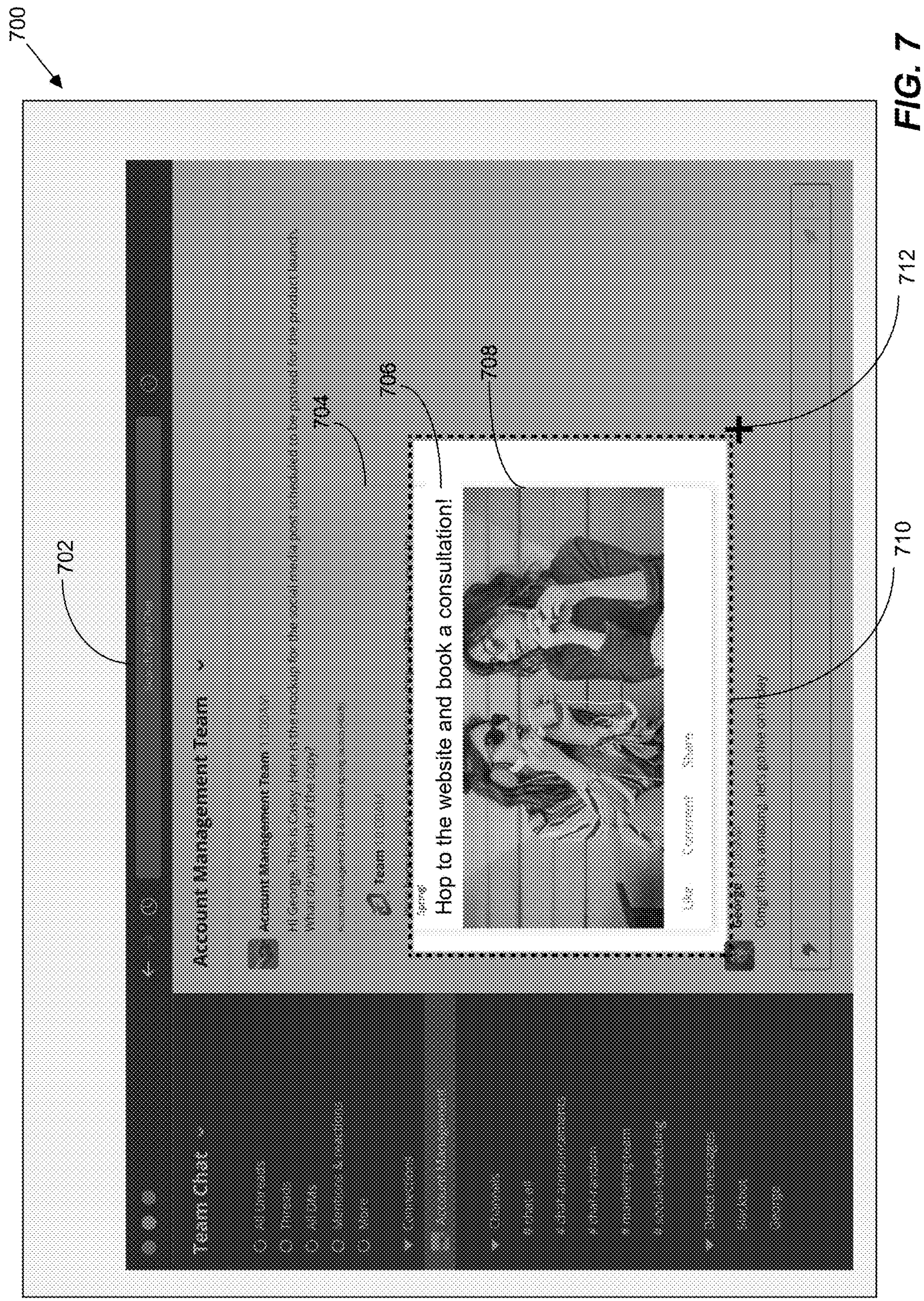
FIG. 7 illustrates a selection interface for selecting displayed content for analysis in an example embodiment.

In some embodiments, the detection system is configured to obtain, analyze, and report on any content displayed on a user computing device. FIG. 7 illustrates a selection interface for selecting displayed content for analysis in an example embodiment. The displayed content 700 is displayed on a display of a user computing device. The displayed content includes an application window 702 of a non-integrated application. A detection application executing on the client computing device provides a selection interface 712 that allows the user to select image data 710 rendered on at least a portion of the display. In some embodiments, the selected image data 710 includes at least a portion of an electronic communication 704. As an alternative and/or addition, the selected image data 710 may include one or more text components 706 and/or one or more image components 708. The detection application and/or another component of the detection system may process the selected image data 710 to obtain image-derived content.

Example Processes

Figure 8:
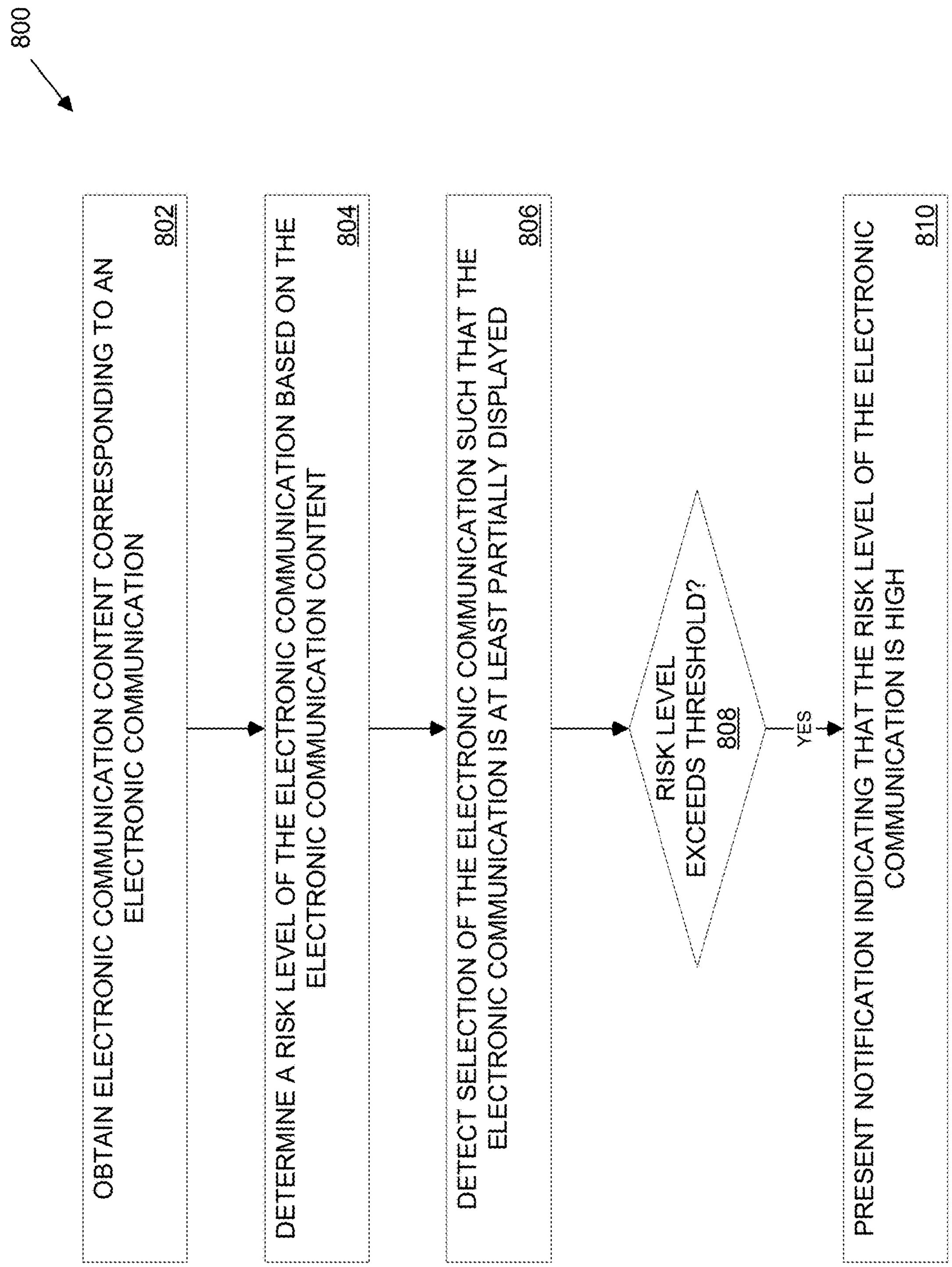
FIG. 8 is a flow diagram of a process for detecting fraudulent electronic communications in an example embodiment.

FIG. 8 is a flow diagram of a process for detecting fraudulent electronic communications in an example embodiment. Process 800 may be performed by one or more computing devices and/or processes thereof. For example, one or more blocks of process 800 may be performed by a computer system, such as computer system 900. In some embodiments, one or more blocks of process 800 are performed by a detection system, such as detection system 110. Process 800 will be described with respect to detection system 110, but is not limited to performance by detection system 110.

At block 802, the detection system 110 obtains electronic communication content corresponding to an electronic communication. In some embodiments, the electronic communication is an email. In some embodiments, the electronic communication content includes content obtained using an integration framework for an electronic communication client executing on the user computing device, such as the Outlook add-in framework. As an alternative and/or addition, the electronic communication content may include content obtained from a communication server, such as an Exchange Server. As an alternative and/or addition, the electronic communication content may include content obtained from system-level software executing on the user computing device. As an alternative and/or addition, the electronic communication content may include image-derived content.

At block 804, the detection system 110 determines a risk level of the electronic communication based on the electronic communication content, the risk level corresponding to a likelihood that the electronic communication includes content produced using generative artificial intelligence (AI).

At block 806, the detection system 110 detects selection of the electronic communication such that the electronic communication is at least partially displayed on a display of a user computing device. In some embodiments, selection of the electronic communication is detected using an integration framework for an electronic communication client executing on the user computing device, such as the Outlook add-in framework.

At decision block 808, the detection system 110 determines whether the risk level of the electronic communication exceeds a fraudulence threshold. In some embodiments, when the risk level of the electronic communication does not exceed the fraudulence threshold, the detection system 110 may perform no additional action. As an alternative and/or addition, the detection system 110 may display, on the display of the user computing device, one or more elements indicating that the risk level of the electronic communication is low. When the risk level of the electronic communication exceeds a fraudulence threshold, processing continues to block 810. In some embodiments, determining the risk level of the electronic communication is based on a model generated based on supervised learning techniques. As an alternative and/or addition, determining the risk level of the electronic communication may be based on a large language model (LLM).

At block 810, the detection system 110 presents a notification on the user computing device, the notification comprising one or more elements indicating that the risk level of the electronic communication is high. As an alternative and/or addition, the one or more elements may communicate that the risk level of the electronic communication is low. In some embodiments, the one or more elements are displayed using an integration framework for an electronic communication client executing on the user computing device, such as the Outlook add-in framework. In some embodiments, a flagged portion of the electronic communication content is identified, and a corresponding warning element is displayed by the flagged portion.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 9:
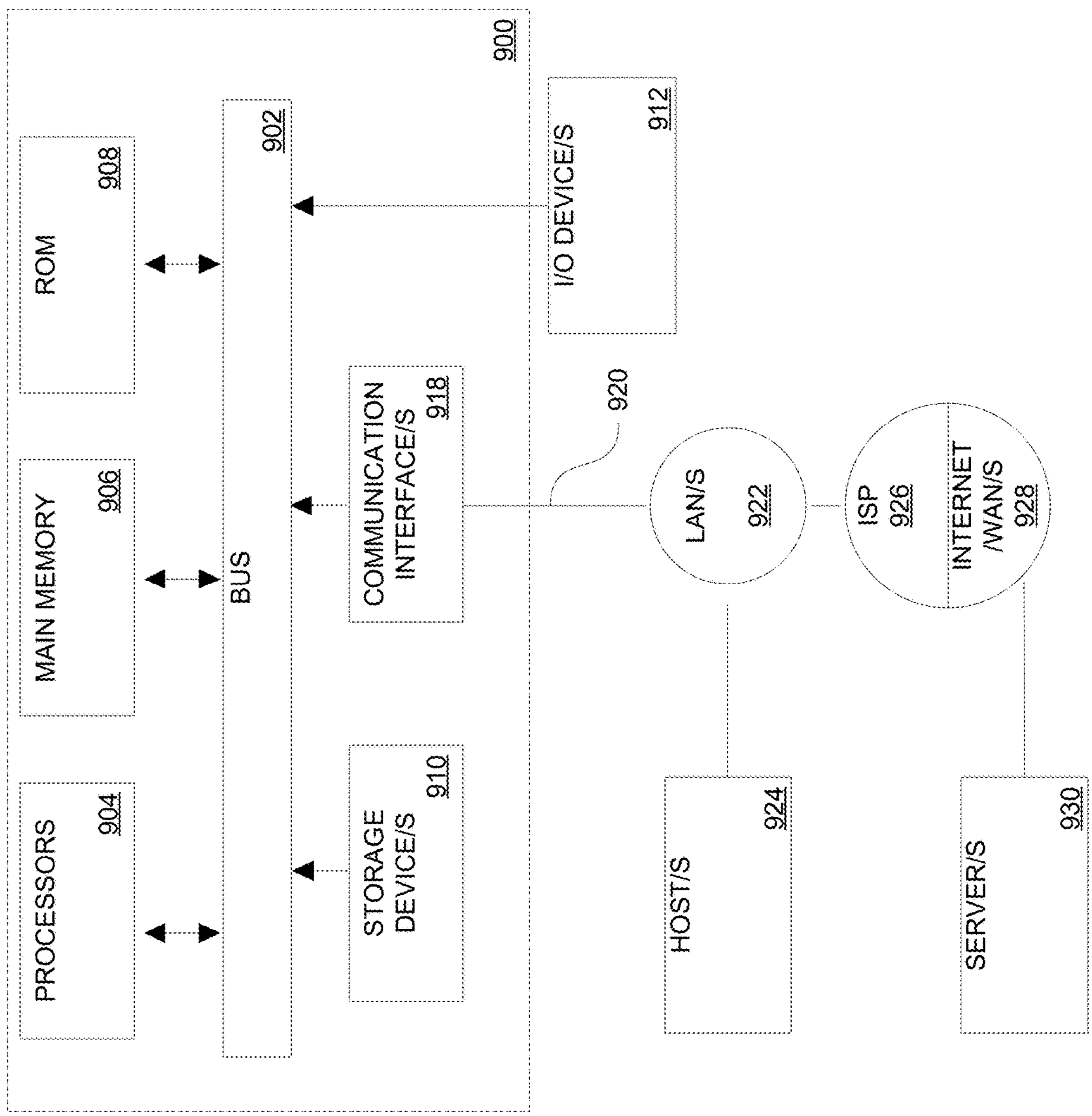
FIG. 9 illustrates a computer system upon which an embodiment may be implemented.

FIG. 9 is a block diagram that illustrates a computer system 900 upon which one or more embodiments described herein may be implemented. The computer system 900 includes a bus 902 or another communication mechanism for communicating information, and one or more hardware processors 904 coupled with bus 902 for processing information, such as computer instructions and data. The hardware processor/s 904 may include one or more general-purpose microprocessors, graphical processing units (GPUs), coprocessors, central processing units (CPUs), and/or other hardware processing units. As an alternative or addition, one or more computer systems 900 may be configured to provide a cloud computing environment, virtual machine, and/or other software-based emulation of a physical computing environment upon which one or more embodiments described herein may be implemented.

The computer system 900 also includes one or more units of main memory 906 coupled to the bus 902, such as random-access memory (RAM) or other dynamic storage, for storing information and instructions to be executed by the processor/s 904. Main memory 906 may also be used for storing temporary variables or other intermediate information during execution of instructions to be executed by the processor/s 904. Such instructions, when stored in non-transitory storage media accessible to the processor/s 904, turn the computer system 900 into a special-purpose machine that is customized to perform the operations specified in the instructions. In some embodiments, main memory 906 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 900 may further include one or more units of read-only memory (ROM) 908 or other static storage coupled to the bus 902 for storing information and instructions for the processor/s 904 that are either always static or static in normal operation but reprogrammable. For example, the ROM 908 may store firmware for the computer system 900. The ROM 908 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 910, such as a magnetic disk or optical disk, is provided and coupled to the bus 902 for storing information and/or instructions. The storage device/s 910 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 900 may be coupled via the bus 902 to one or more input/output (I/O) devices 912. For example, the I/O device/s 912 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 912 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 904 and for controlling cursor movement on another I/O device (e.g. a display). A cursor control device typically has at degrees of freedom in two or more axes, (e.g. a first axis x, a second axis y, and optionally one or more additional axes z), that allows the device to specify positions in a plane. In some embodiments, the one or more I/O device/s 912 may include a device with combined I/O functionality, such as a touch-enabled display.

Other I/O device/s 912 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 904 over the bus 902.

The computer system 900 may implement the techniques described herein using customized hard-wired logic, one or more ASICs or FPGAs, firmware, and/or program logic that causes computer system 900 to be a special-purpose machine. According to one embodiment, the techniques herein are performed by the computer system 900 in response to the processor/s 904 executing one or more sequences of one or more instructions contained in main memory 906. Such instructions may be read into main memory 906 from another storage medium, such as the one or more storage device/s 910. Execution of the sequences of instructions contained in main memory 906 causes the processor/s 904 to perform the process steps described herein. In alternative embodiments, hard-wired circuitry may be used in place of or in combination with software instructions.

The computer system 900 also includes one or more communication interfaces 918 coupled to the bus 902. The communication interface/s 918 provide two-way data communication over one or more physical or wireless network links 920 that are connected to a local network 922 and/or a wide area network (WAN), such as the Internet. For example, the communication interface/s 918 may include an integrated services digital network (ISDN) card, cable modem, satellite modem, or a modem to provide a data communication connection to a corresponding type of telephone line. Alternatively and/or in addition, the communication interface/s 918 may include one or more of: a local area network (LAN) device that provides a data communication connection to a compatible local network 922; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between the computer system 900 and one or more LANs 922 and/or WANs.

The network link/s 920 typically provides data communication through one or more networks to other data devices. For example, the network link/s 920 may provide a connection through one or more local area networks 922 (LANs) to one or more host computers 924 or to data equipment operated by an Internet Service Provider (ISP) 926. The ISP 926 provides connectivity to one or more wide area networks 928, such as the Internet. The LAN/s 922 and WAN/s 928 use electrical, electromagnetic, or optical signals that carry digital data streams. The signals through the various networks and the signals on the network link/s 920 and through the communication interface/s 918 are example forms of transmission media or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire, and fiber optics, including traces and/or other physical electrically conductive components that comprise the bus 902. Transmission media can also take the form of acoustic or light waves, such as those generated during radio-wave and infrared data communications.

Various forms of media may be involved in carrying one or more sequences of one or more instructions to the processor 904 for execution. For example, the instructions may initially be carried on a magnetic disk or solid-state drive of a remote computer. The remote computer can load the instructions into its main memory 906 and send the instructions over a telecommunications line using a modem. A modem local to the computer system 900 can receive the data on the telephone line and use an infrared transmitter to convert the data to an infrared signal. An infra-red detector can receive the data carried in the infra-red signal and appropriate circuitry can place the data on the bus 902. The bus 902 carries the data to main memory 906, from which the processor 904 retrieves and executes the instructions. The instructions received by main memory 906 may optionally be stored on the storage device 910 either before or after execution by the processor 904.

The computer system 900 can send messages and receive data, including program code, through the network(s), the network link 920, and the communication interface/s 918. In the Internet example, one or more servers 930 may transmit signals corresponding to data or instructions requested for an application program executed by the computer system 900 through the Internet 928, ISP 926, local network 922 and a communication interface 918. The received signals may include instructions and/or information for execution and/or processing by the processor/s 904. The processor/s 904 may execute and/or process the instructions and/or information upon receiving the signals by accessing main memory 906, or at a later time by storing them and then accessing them from the storage device/s 910.

OTHER ASPECTS OF DISCLOSURE

Although the concepts herein have been described with reference to particular embodiments, it is to be understood that these embodiments are merely illustrative of the principles and applications of the present disclosure. Unless otherwise specified, descriptions of individual elements depicted in one drawing are understood to optionally apply to similar elements depicted in other drawings, either individually or in combination. It is therefore to be understood that numerous modifications may be made to the illustrative embodiments and that other arrangements may be devised without departing from the spirit and scope of the present disclosure, and as defined by the appended claims.

What is claimed is:

1. A method comprising:

obtaining electronic communication content corresponding to an electronic communication;

determining a risk level of the electronic communication based on the electronic communication content, the risk level corresponding to a likelihood that the electronic communication includes content produced using generative artificial intelligence (AI);

detecting selection, by a user, of the electronic communication from a plurality of electronic communications such that the electronic communication is at least partially displayed on a display of a user computing device; and in response to detecting selection of the electronic communication, when the risk level of the electronic communication exceeds a fraudulence threshold, presenting a notification on the user computing device, the notification comprising one or more elements indicating that the risk level of the electronic communication selected by the user is high;

wherein the method is performed by one or more processors.

2. The method of claim 1, further comprising:

in response to detecting selection of the electronic communication, when the risk level of the electronic communication does not exceed the fraudulence threshold, displaying, on the display of the user computing device, one or more elements indicating that the risk level of the electronic communication is low.

3. The method of claim 1, wherein the electronic communication is an electronic mail (email).

4. The method of claim 1, wherein the electronic communication content includes content obtained using an integration framework for an electronic communication client executing on the user computing device.

5. The method of claim 1, wherein selection of the electronic communication is detected using an integration framework for an electronic communication client executing on the user computing device.

6. The method of claim 1, wherein the one or more elements are displayed using an integration framework for an electronic communication client executing on the user computing device.

7. The method of claim 1, wherein the electronic communication content includes content obtained from a communication server configured to handle communications including the electronic communication for a plurality of users including the user.

8. The method of claim 1, wherein the electronic communication content includes content obtained from system-level software executing on the user computing device.

9. The method of claim 1, further comprising:

capturing an image rendered on at least a portion of the display of the user computing device; and processing the image to obtain image-derived content;

wherein the electronic communication content includes the image-derived content.

10. The method of claim 1, further comprising:

identifying a flagged portion of the electronic communication content;

identifying a display position of the flagged portion on the user computing device; and displaying, by the display position of the flagged portion, a corresponding warning element indicating that the flagged portion is suspect.

11. The method of claim 1, wherein determining the risk level of the electronic communication is based on a model generated based on supervised learning techniques.

12. The method of claim 1, wherein determining the risk level of the electronic communication is based on a large language model (LLM).

13. A non-transitory computer-readable medium storing instructions that, when executed by one or more processors of a computer system, cause the computer system to:

obtain electronic communication content corresponding to an electronic communication;

determine a risk level of the electronic communication based on the electronic communication content, the risk level corresponding to a likelihood that the electronic communication includes content produced using generative artificial intelligence (AI);

detect selection, by a user, of the electronic communication from a plurality of electronic communications such that the electronic communication is at least partially displayed on a display of a user computing device; and in response to detecting selection of the electronic communication, when the risk level of the electronic communication exceeds a fraudulence threshold, present a notification on the user computing device, the notification comprising one or more elements indicating that the risk level of the electronic communication selected by the user is high.

14. The non-transitory computer-readable medium of claim 13, wherein the electronic communication is an electronic mail (email).

15. The non-transitory computer-readable medium of claim 13, wherein the electronic communication content includes content obtained using an integration framework for an electronic communication client executing on the user computing device.

16. The non-transitory computer-readable medium of claim 13, wherein the electronic communication content includes content obtained from system-level software executing on the user computing device.

17. The non-transitory computer-readable medium of claim 13, wherein the instructions, when executed by the one or more processors, cause the computer system to:

capture an image rendered on at least a portion of the display of the user computing device; and process the image to obtain image-derived content;

wherein the electronic communication content includes the image-derived content.

18. The non-transitory computer-readable medium of claim 13, wherein the instructions, when executed by the one or more processors, cause the computer system to:

identify a flagged portion of the electronic communication content;

identify a display position of the flagged portion on the user computing device; and display, by the display position of the flagged portion, a corresponding warning element indicating that the flagged portion is suspect.

19. The non-transitory computer-readable medium of claim 13, wherein the instructions, when executed by the one or more processors, cause the computer system to:

in response to detecting selection of the electronic communication, when the risk level of the electronic communication does not exceed the fraudulence threshold, display, on the display of the user computing device, one or more elements indicating that the risk level of the electronic communication is low.

20. A computer system comprising:

one or more hardware processors;

at least one memory storing one or more instructions which, when executed by the one or more hardware processors, cause the one or more hardware processors to:

obtain electronic communication content corresponding to an electronic communication;

determine a risk level of the electronic communication based on the electronic communication content, the risk level corresponding to a likelihood that the electronic communication includes content produced using generative artificial intelligence (AI);

detect selection, by a user, of the electronic communication from a plurality of electronic communications such that the electronic communication is at least partially displayed on a display of a user computing device; and in response to detecting selection of the electronic communication, when the risk level of the electronic communication exceeds a fraudulence threshold, presenting a notification on the user computing device, the notification comprising one or more elements indicating that the risk level of the electronic communication selected by the user is high.

* * * * *